United States Patent [19]

Jenkins et al.

[11] 4,041,115
[45] Aug. 9, 1977

[54] CONTINUOUS PROCESS FOR PREPARING PARTICULATE MICROPOROUS, OPEN-CELLED POLYMER STRUCTURES IN A SCREW-TYPE EXTRUDER

[75] Inventors: Francis Edward Jenkins; Daniel Gregory Tynan, both of Wilmington, Del.

[73] Assignee: E. I. Du Pont de Nemours and Company, Wilmington, Del.

[21] Appl. No.: 576,632

[22] Filed: May 12, 1975

[51] Int. Cl.² .............................................. B29D 27/00
[52] U.S. Cl. .................................... 264/5; 260/2.5 M; 264/9; 264/28; 264/41; 264/49; 264/DIG. 5; 264/DIG. 13
[58] Field of Search ...................... 264/9, 41, 49, 28, 5, 264/DIG. 5, DIG. 13; 260/2.5 R, 2.5 M

[56] References Cited

U.S. PATENT DOCUMENTS

| | | | |
|---|---|---|---|
| 3,308,211 | 3/1967 | Plastridge | 264/9 X |
| 3,462,337 | 8/1969 | Gorton | 156/330 |
| 3,468,986 | 9/1969 | Watanabe | 264/9 |
| 3,752,784 | 8/1973 | Jenkins | 260/2.5 R |
| 3,753,932 | 8/1973 | Jenkins | 260/2.5 R |
| 3,812,224 | 5/1974 | Smith et al. | 264/28 |
| 3,936,517 | 2/1976 | Thomas | 264/28 |

OTHER PUBLICATIONS

Natta, Giulio "Progress in Five Years of Research in Stereospecific Polymerization," in SPE Journal, May 1959, pp. 373-382.
Brandrup, J. and E. H. Immergut, Editors, "Polymer Handbook," New York, Interscience, c1966, pp. III-33, 34, 37, 39, 42, 46, 48, 51, 52, 57, 64, 65, 68, 71, 72, 74, 85, 86, 87, 88.

*Primary Examiner*—Philip Anderson
*Attorney, Agent, or Firm*—James A. Costello

[57] ABSTRACT

A continuous process for preparing particulate microporous, open-celled polymer structures in a co-rotating twin-screw processor comprising agitating normally solid organic polymer and chlorofluorocarbon in the melt zone of said processor, cooling the resulting solution under agitation in the cooling and milling zone, extruding a snow-like mass from the cooling and milling zone, and then removing the chlorofluorocarbon from the snow-like mass to leave the polymer structures.

1 Claim, 8 Drawing Figures

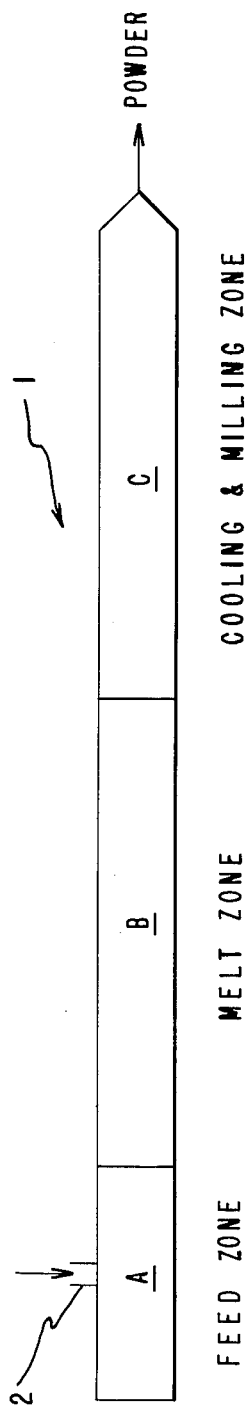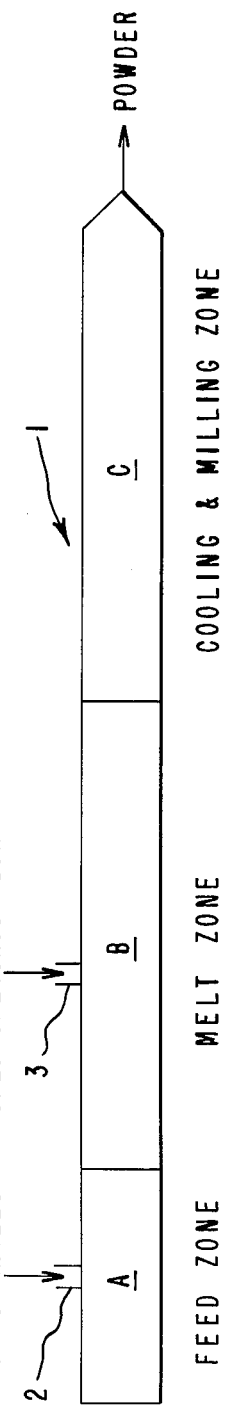

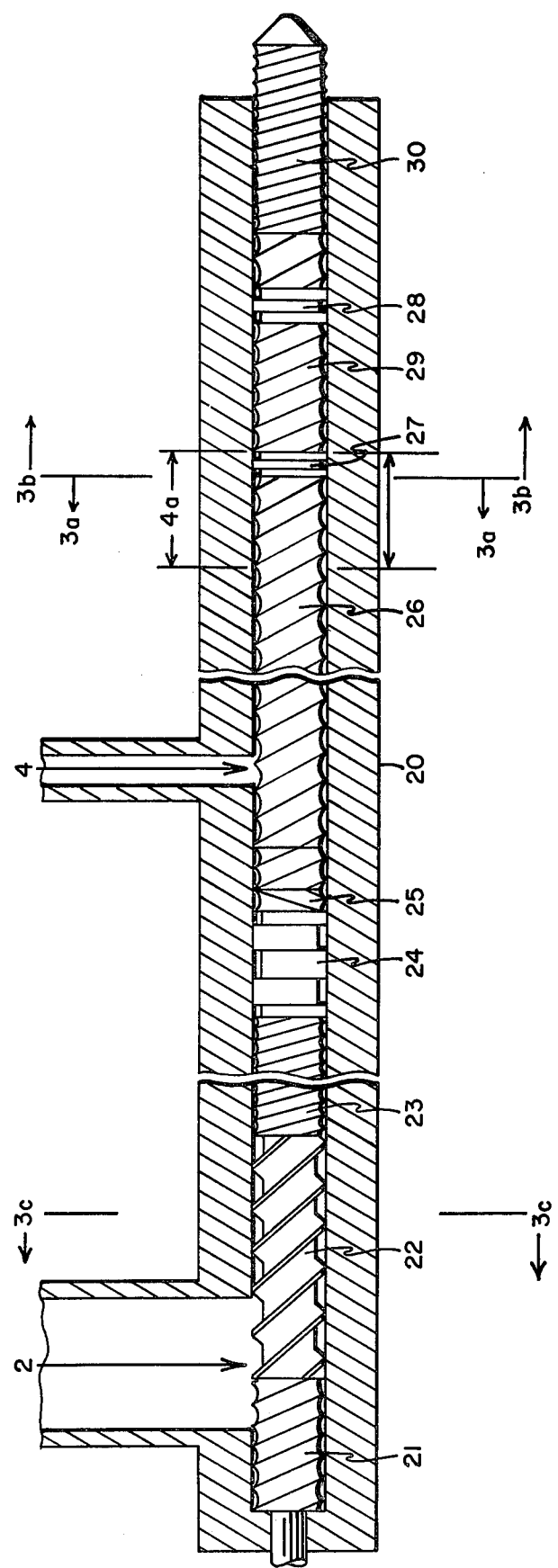

CONTINUOUS PROCESS FOR PREPARING PARTICULATE MICROPOROUS, OPEN-CELLED POLYMER STRUCTURES IN A SCREW-TYPE EXTRUDER

BACKGROUND OF THE INVENTION

Mechanical grinding methods for preparing polymers in particulate form are useful only with polymers that possess sufficient modulus or brittleness to be broken down into particulate forms. For certain polymers such as polyacrylates, polyethylene, polypropylene, or ionic copolymers, comminution is difficult and must be carried out under cryogenic conditions. The process of this invention provides a process for producing comminuted polymer structures without cryogenic "grinding".

The process of this invention is an improvement over the processes taught in U.S. Pat. Nos. 3,752,784 and 3,753,932. This patent application is related to "A Process For Preparing Particulate Microporous, Open-Celled Polymer Structures", coassigned, and filed concurrently herewith in the name of Francis Edward Jenkins, bearing U.S. Ser. No. 576,634. It is also related to "A Process For Preparing Microporous, Open-Celled Cellular Polyblend Structures", coassigned, and filed concurrently herewith in the name of Francis Edward Jenkins, bearing U.S. Ser. No. 576,631.

SUMMARY OF THE INVENTION

The invention herein concerns a process for making particulate structures without the need for employing surface active agents, and with zero or negligible amounts of cosolvents or water. The method of this invention permits rapid continuous preparation of fine, uniform polymer powders at a high ratio of polymer to chlorofluorocarbon feed. It has been found that polymer solution having a solids content of up to at least 50% can be prepared and processed into fine polymeric powders in a matter of minutes. Further, plasticizers or pigments required in the end use of the polymer powders can be directly incorporated into the powder during the process of this invention.

The invention concerns a continuous process for preparing particulate, microporous, open-celled polymer structures comprising i. continuously feeding from about 5 to 50 parts by weight of a normally solid organic polymer and from about 95 to 50 parts by weight of a chlorofluorocarbon or a mixture of chlorofluorocarbons having a boiling point in the range of from about 10° to 150° C, a melting point in the range of about −40° to 125° C, an entropy of fusion of less than 10 calories/°K/mole, a plastic flow index of at least 0.1 g/10 minutes at the reduced temperature of 0.96 to 0.99 and a solubility in water of less than 2 weight percent to a screw-type extruder having first and second temperature zones, ii. nonrandomly milling said polymer and said chlorofluorocarbon in said first zone at a temperature equal to or above the melting point of the highest melting chlorofluorocarbon present to provide a uniformly milled mixture, iii. passing said uniformly milled mixture to said second zone and nonrandomly milling said mixture and cooling said mixture to a temperature equal to or below the solidification temperature of the lowest melting chlorofluorocarbon present to form a frozen mass, iv. extruding the frozen mass from the second zone as a snow-like mass, and v. removing the chlorofluorocarbon from the snow-like mass at a temperature equal to or below the solidification temperature of the lowest melting chlorofluorocarbon present.

By "nonrandomly milling" as the term is employed herein is meant that each portion or element of the polymerchlorofluorocarbon mixture, no matter how viscous or concentrated is the mixture, receives essentially the same degree of sheer stress for essentially the same period of time at essentially the same temperature.

The normally solid organic polymers have a glass transition temperature $(T_g)$ or a crystalline melting point $(T_m)$ of at least 293° K. As employed herein, the term "polymer" includes homopolymers and/or copolymers depending upon the context.

The chlorofluorocarbon solvent contemplated herein is selected from at least one member of the group consisting of

|  | Melting Point ° C | Boiling Point ° C |
|---|---|---|
| 1,1,1,2,2-pentachloro-2-fluoroethane | 100 | 137 |
| 1,1,2,2-tetrachloro-1,2-difluoroethane | 24 | 93 |
| 1,1,1,2-tetrachloro-2,2-difluoroethane | 41 | 92 |
| 1,1,2-trichloro-1,2,2-trifluoroethane | −37 | 48 |
| 1,1,1-trichloro-2,2,2-trifluoroethane | 14 | 46 |
| 1,1,1,3-tetrafluoro-2,2,3,3-tetrachloropropane | 42 | 112 |
| 1,1,1,3,3-pentafluoro-2,2,3-trichloropropane | −4 | 72 |
| 1,1,1,3,3,3-hexafluoro-2,2-dichloropropane | 3 | 33 |
| 1,1,1,4,4,4-hexafluoro-2,2,3,3-tetrachlorobutane | 86 | 131–136 |
| 1,1,2,2-tetrachloroperfluorocyclobutane | 85 | 136 |
| 1,2-dichloroperfluorocyclobutane | −15 | 60 |
| 1-chloroperfluorocyclobutane | −39 | 27 |
| 1,2-dichloroperfluorocyclohexane | 34 | 108 |

In the list of chlorofluorocarbons, the melting points and boiling points have been given to the nearest whole degree. The preferred chlorofluorocarbon is 1,1,1,2-tetrachloro-2,2-difluoroethane. The preferred mixture is 1,1,1,2-tetrachloro-2,2-difluoroethant and 1,1,2,2-tetrachloro-1,2-difluoroethane.

Cosolvents can be employed herein at up to 9 volumes per volume of chlorofluorocarbon. Contemplated cosolvents include methanol, ethanol, isopropanol, t-butanol, dimethylformamide, dimethylacetamide, dioxane, trioxane, dimethyl sulfoxide, tetrahydrofuran, acetone, methyl ethyl ketone, hexamethylphosphoramide, acetic acid, butyrolactone, N-methylpyrrolidone, pyridine, morpholine, methyl "Cellosolve", ethyl "Cellosolve", propyl "Cellosolve" and mixtures thereof. Usually, the cosolvent is present, if at all, from at least about 0.1 volume per volume of solvent, and preferably at from about 0.5 to 1.5 volumes per volume.

Polymers useful in the process of this invention include

I. Addition polymers such as
 a. homopolymers such as polystyrene, polyisobutylene, polyethylene, polypropylene, polychloroprene, polybutadiene, polyisoprene, polyvinyl acetate, polyvinyl chloride, polymethyl methacrylate, polybutyl methacrylate, and the like;
 b. copolymers such as those of styrene-butadiene, ethylene-propylene-diene, styrene-butadiene-isoprene, ethylenevinyl acetate, styrene-acrylonitrile-butadiene, ethylenemethacrylic acid, hexafluoropropylene-vinylidene fluoride, vinylidene fluoride-tetrafluoroethylene-vinyl butyrate, tetrafluoroethylene -isobutylene, methyl methacrylate-butyl methacrylate and the like;

II. Condensation polymers such as polyurethane, polyamide, polycarbonate, polyester, polyvinyl butyral, polysulfone, polyepoxide, polyphenylene oxide and the like; and III. Cellulosic polymers such as ethyl cellulose, cellulose acetate, cellulose acetate-butyrate and the like.

It is highly desirable that the polymers employed in the novel process have either $T_g$ or $T_m$ of at least 293° K since those polymers which do not have said minimum $T_g$ or $T_m$ values will form powders which can coalesce at ambient temperatures to provide products which are not free-flowing powders.

Glass transition temperature ($T_g$) and crystalline melting point ($T_m$) are well-known terms in the polymer art. Glass transition temperature ($T_g$) is the temperature at which the polymer abruptly changes from hard, brittle, and glassy to a softer, more flexible, and rubbery material. Crystalline melting point ($T_m$) is the temperature at which the polymer crystalline phase disappears with a drastic change in the physical properties such as becoming a viscous liquid with discontinuous changes in density, refractive index, heat capacity and the like.

Some representative polymers and their $T_g$ and $T_m$ values as listed in "Polymer Handbook" by J. Brandrup and E. H. Immergut, Interscience Publishers, 1966, pp. III-1 to III-75 are listed below.

|  | $T_g$ (° K) | $T_m$ (° K) |
|---|---|---|
| polyethylene |  |  |
| low pressure-linear | 148 | 383 |
| polypropylene |  |  |
| isotactic | 263 | 449 |
| polymethylmethacrylate |  |  |
| random | 378 |  |
| isotactic | 318 | 433 |
| syndiotactic | 388 | 473 |
| polyvinyl chloride |  |  |
| syndiotactic | 354[1] | 485[1] |
| polystyrene |  |  |
| isotactic | 373 | 513 |
| (1,2)-poly-1,3-butadiene |  |  |
| isotactic | 269 | 393 |
| syndiotactic |  | 427 |
| (1,4)-poly-1,3-butadiene |  |  |
| trans | 255 | 373 |
| polyhexamethylene adipamide | 330 | 538 |

[1] $T_g$ and $T_m$ are highly dependent on polymerization temperature.

BRIEF DESCRIPTION OF THE DRAWINGS

FIGS. 1a and 1b are schematic views illustrating the required temperature zones and alternate feeding schemes of the contemplated twin-screw processor.

FIG. 2 is a schematic side view of one screw of the twin-screw processor, showing the arrangement of elements mounted upon the shaft of the screw;

DETAILS OF THE INVENTION

Figure 3A:
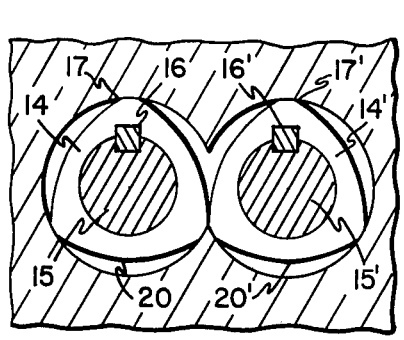
FIG. 3a is a sectional view taken on line 3a—3a of FIG. 2, looking toward the feed end of the twin-screw processor, showing the cross-section of the three-tip screw elements mounted in twin-bore barrels.

Referring to the Figures, the process of this invention is carried out in twin-screw devolatilizing processor 1. As shown schematically in FIGS. 1a and 1b, the processor consists of three zones: feed zone A, melt zone B, and cooling and milling zone C. Cool fluid, such as cold water, is circulated in cold zones A and C through the jacketed twin bore barrel enclosing the co-rotating screws. Heat can be supplied to zone B by circulating hot fluid through the jacketed barrel; or alternatiely, electric heating elements may be used to supply heat to zone B.

In one scheme, as shown in FIG. 1a, a premix of organic polymer pellets or granules plus unmelted chlorofluorocarbon is fed into feed zone A through feed port 2. Alternatively, as shown in FIG. 1b, polymer pellets alone are fed into feed zone A through feed port 2 and molten chlorofluorocarbon is injected downstream into melt zone B through injection port 3. In either scheme, polymer and chlorofluorocarbon are forcibly advanced to melt zone B and worked into a solution by the kneading action of the screws and kneading elements with the aid of the additional heat (if needed) supplied through the screw barrel.

The temperature of zone B is maintained equal to or higher than the melting point of the chlorofluorocarbon. The solution is then forcibly advanced to milling zone C where the solution is cooled to form a frozen mass and agitated vigorously. The temperature of zone C is maintained equal to or lower than the solidification temperature of the chlorofluorocarbon. The agitated mass exits the extruder from zone C in the form of a snow-like mass from which mass chlorofluorocarbon is easily removed by sublimation to leave a fine, uniform organic polymer powder.

The preferred arrangement of elements mounted upon the shaft of the scrrew 20 is illustrated in FIG. 2 and consists of: an initial section 21 of co-rotating, righthanded, self-wiping screw with a fine screw pitch upstream of the injection ports; a section 22 of co-rotating, righthanded, deep flighted, non-self-wiping screws with a relatively coarse screw pitch into which section the components of solution are fed through feed port 2; a pumping and transport section 23 of co-rotating, righthanded, self-wiping screws with a fine screw pitch; a homogenizing section 24 of co-rotating kneading discs, followed by a short section 25 of left-handed screw elements; a pumping and transport section 26 of co-rotating, right-handed self-wiping screws; two homogenizing sections 27 and 28 separated by a section 29 of co-rotating right-handed screw of fine screw pitch; and a final discharge section 30.

Figure 3B:
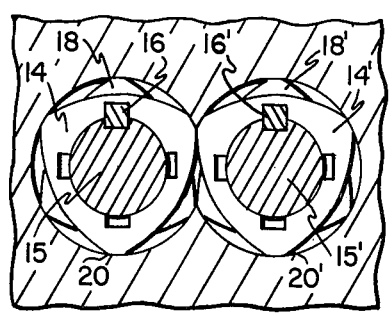
FIG. 3b is a sectional view taken on line 3b—3b of FIG. 2, looking toward the discharge end of the twin-screw processor, showing the cross-section of three-tipped kneading discs mounted in twin-bore barrels.
Figure 3C:
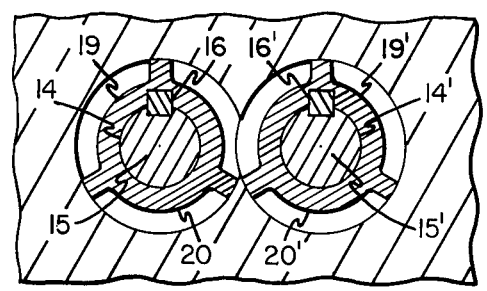
FIG. 3c is a sectional view taken on line 3c—3c of FIG. 2, looking toward the feed end of the twin-screw processor, showing the cross section of deep flighted screws mounted in twin-bore barrels.

As shown in FIGS. 3a, 3b, and 3c, these screw sections are assembled by sliding bushings 14 and 14' on shafts 15 and 15' to form the twin screws 20 and 20'. Keys 16 and 16' prevent rotation of the bushings with respect to the axis and thereby maintain the desired surface configuration of the screw.

Figure 4A:
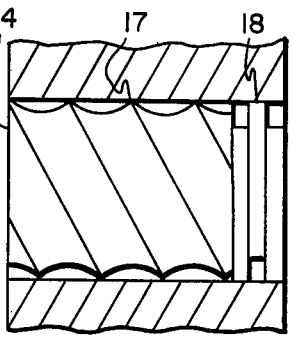
FIG. 4a is a detailed side view of a three-tip screw element and three-tip kneading discs of the types shown in cross-section in FIGS. 3a and 3b, mounted together as schematically shown in FIG. 2.

The screw elements of sections 21, 23, 26, 29 and 30 are bushings having three-tipped cross section 17 and 17' as illustrated in FIG. 3a with the cross sections being continuously rotated along the length of the axes of the bushings to evolve triple-threaded screw surfaces as illustrated in FIG. 4a. The pitch and fineness of the screw surfaces are regulated as desired, and the bushing-to-bushing and bushing-to-wall clearances are kept small so that the screw elements wipe one another and the wall as the shafts rotate together in the same direction.

The kneading elements of homogenizing sections 24, 27, and 28 are bushings having three-tipped cross sections 18 and 18' as illustrated in FIG. 3b which when rotated do not evolve a triple-threaded screw. These three-tipped bushing are placed on the shaft alternately at a 60° angle and at a coincident angle to the preceding screw elements. The kneading elements are continuously self-wiping just as the screw elements are.

Figure 4B:
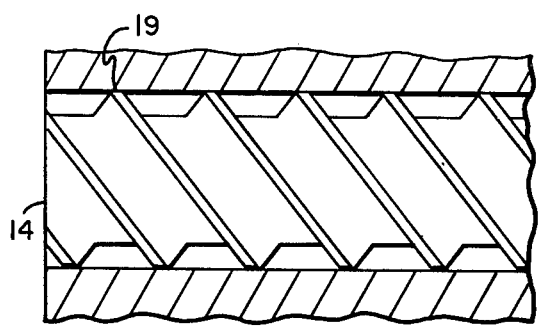
FIG. 4b is a detailed side view of one of the deep-flighted screw elements shown in FIG. 3c.

The deep flighted screw elements of section 22 are bushings having three-tipped cross sections 19 and 19' as shown in FIG. 3c with the cross section being continuously rotated along the length of the axis of the bushing to evolve triple-threaded screw surfaces as illustrated in FIG. 4b. However, the bushing-to-bushing clearances of the deep flighted screws are kept large and the screws are not self-wiping although the barrel walls are wiped.

The twin-screw processor described above is just one example of many possible configurations that could be used for this invention. The deep flighted screw elements of section 22 would probably not be required on processors with larger screw diameters. Similarly, monolithic screws machined into proper configurations could be used rather than separate sliding bushings on screw shafts.

Concerning the useful chlorofluorocarbons and their various characterizing features as described herein: boiling points, melting points and solubilities have the usual meaning. Entropy of fusion is defined as $\Delta H_f/T_f$ where $\Delta H_f$ is the heat of fusion in calories per mole and $T_f$ is the fusion temperature in °K (degree Kelvin). Plastic flow index is a measure of the rate of extrusion of solid chlorofluorocarbon as measured on a plastometer according to ASTM D1238–65T and the reduced temperature is defined as $T/T_f$ where T is the temperature at which the plastic flow index is determined and $T_f$ is the fusion temperature, both in °K. It is to be noted that the plastic flow inndex is determined at a temperature below the melting point of the chlorofluorocarbon (reduced temperature less than 1).

Some representative entropy of fusion values and plastic flow index values are given below.

| Freezing Points of Mixture of $CCl_2FCCl_2F$ and $CCl_3CClF_2$ | |
|---|---|
| Wt. % $CCl_3CClF_2$ | Freezing Point, °C |
| 0 | 23.5 |
| 10 | 27.4 |
| 20 | 28.9 |
| 30 | 30.4 |
| 40 | 31.8 |
| 50 | 33.3 |
| 60 | 34.7 |
| 70 | 36.2 |
| 80 | 37.7 |
| 90 | 39.1 |
| 100 | 40.6 |

The polymer powder produced by the process of this invention contains particles in the range of from about 75 $\mu$ (micron) to about 1 mm, depending upon the polymer concentration and the degree of subdivision of solidified chlorofluorocarbon-polymer composition. Each powder particle is, however, of microporous, open-celled cellular structure containing a pore size of from 1 to 15 $\mu$ and a void content of from about 50% to 99%. The pore size and void content are dependent upon polymer concentration. Because of the cellular nature of the powder particles, only a very gentle grinding is required to provide even finer polymer powders of, say 30-40 $\mu$ size.

The cellular nature of the powder particles inherently provides lower bulk density than those powder particles prepared by conventional methods, such as by grinding or pulverizing of bulk polymer. The lower bulk density contributes to the ease of fluidization such as in fluidized bed powder coating process. The microporous, open-celled cellular structure of the powder particles permits post-blending of polymer additives without adversely affecting their fluidizability. Thus, polymer additives such as plasticizer, dyes, pigments or stabilizer can be blended in the conventional amounts with the polymer powder prepared by the present method without appreciably affecting their fluidizability.

Certain process versatilities characterize the novel process of this invention. For instance, "polyblend" powders can be prepared which are physical mixtures of at least two thoroughly mixed, normally incompatible organic polymers. Polyblends are being used in-

| Chlorofluorocarbon | Entropy of Fusion Cal./° K/Mole | Plastic Flow Index g/10 Min. | Reduced Temp. $(T/T_f)$ |
|---|---|---|---|
| 1,1,1,2,2-pentafluoro-2-fluoroethane | 4.15 | 0.9 | 0.977 |
| 1,1,2,2-tetrachloro-1,2-difluoroethane | 3.0 | 0.4 | 0.985 |
| 1,1,1-trichloro-2,2,2-trifluoroethane | 1.61 | 1.1 | 0.986 |
| 1,1,1,2-tetrachloro-2,2-difluoroethane | 3.74 | 8.5 | 0.993 |
| 1,1,1,4,4,4-hexafluoro-2,2,3,3-tetra-chlorobutane | 2.43 | 0.5 | 0.985 |
| 1,1,2,2-tetrachloroperfluorocyclobutane | 3.66 | 3.5 | 0.981 |
| 1,2-dichloroperfluorocyclobutane | 2.03 | — | — |

Below is shown the solidification temperature of mixtures of 1,1,2,2-tetrachloro-1,2-difluoroethane ($CCl_2FCCl_2F$) and 1,1,1,2-tetrachloro-2,2-difluoroethane ($CCl_3CClF_2$) as a function of the $CCl_3CClF_2$ content in the mixture.

creasingly in various industries because they provide characteristics such as greater strength, added toughness, greater flexibility, greater resistance to environmental influences and the like not present to a desirable degree in the individual polymer.

For additional disclosure concerning the process for making particulate (as well as coherent) polyblend structures consult coassigned patent application bearing U.S. Ser. No. 576,631, filed concurrently herewith, having the title "Process for Preparing Microporous, Open-Celled Cellular Polyblend Structures". Said additional disclosure provides a fuller explanation of the types of polyblend structures that can be made (in particulate form) by the process of the instant invention.

Polyblend powders are prepared according to the process of this invention by mixing separate solutions of polymers in chlorofluorocarbon, a mixture of chlorofluorocarbons or a homogeneous solvent blend of chlorofluorocarbon and a cosolvent, and by rapidly cooling the mixture under agitation to provide a snow-like mass of a mixture of polymers dissolved in, or intimately dispersed in, a solidified chlorofluorocarbon matrix. Removal of the chlorofluorocarbon by any known method provides microporous, open-celled, cellular polyblend powders. The successful use of the present process in preparing polyblend powders is based upon the unusually low heats of fusion of the useful chlorofluorocarbons such that the rate of solidification of the chlorofluorocarbon greatly exceeds the rate of polymer separation. Polyblend powders preparable by the present process include polyblend mixtures comprising those polymers which are mutually reactive and/or mutually immiscible in the molten state.

It has now also been found that a simple mixing of a liquid chlorofluorocarbon described herein with an aqueous dispersion of dyes or pigments (the dispersion can be a high-solids-content dispersion such as an aqueous filter press cake) will bring about an almost complete transfer of the dye or pigment into the chlorofluorocarbon phase as fine particles. Such "flushing" into the chlorofluorocarbon phase is equally effective when the aqueous dispersion is mixed with chlorofluorocarbon containing polymer dissolved therein. Thus, by mixing an aqueous dispersion of dye or pigment with a chlorofluorocarbon-polymer solution or its feed stock and proceeding with the process as described herein, colored polymer powders are obtained. The amount of color body incorporated into the polymer will be such that the colored polymer powder can be used as color concentrate for blending with further amounts of polymer powder or the colored polymer powder can be used directly.

The following Examples are meant to illustrate but not limit the scope of this invention. In each Example, the polymer powder produced was found to be a microporous, open-celled structure.

The Twin-Screw Extruder Processor

The twin-screw extruder processor apparatus was assembled in accordance with FIGS. 1-4 from commercially available equipment and screw elements (based on Model ZDS-K28 of Werner & Pfleiderer Maschinenfabrik, Stuttgart, W. Germany). The screws when assembled had a diameter of 27.9-28.0 mm with a radial clearance of 0.075-0.175 mm and total screw length 772 mm, the first 120 mm corresponding to feed zone A, the next 280 mm corresponding to melt zone B, and the next 350 mm corresponding to milling zone C. The screws protruded from the barrel for a distance of 22 mm.

The elements comprising the twin screw used were as follows:

| Length | Element |
|---|---|
| 48 mm | Right-handed screw of 24 mm pitch |

—continued

| Length | Element |
|---|---|
| 90 mm | Right-handed, deep flighted screw of 45 mm pitch |
| 90 mm | Right-handed screw of 15 mm pitch |
| 40 mm | Staggered kneading discs |
| 8 mm | Left-handed screw of 24 mm pitch |
| 16 mm | Right-handed screw of 24 mm pitch |
| 330 mm | Right-handed screw of 30 mm pitch |
| 9 mm | Staggered kneading discs |
| 48 mm | Right-handed screw of 24 mm pitch |
| 13 mm | Staggered kneading discs |
| 20 mm | Right-handed screw of 30 mm pitch |
| 60 mm | Right-handed screw of 15 mm pitch |

EXAMPLE 1

Ethylene/vinyl acetate copolymer pellets, pre-mixed with unmelted 1,1,1,2-tetrachloro-2,2-difluoroethane, were fed to the twin-screw processor described above at a point, 2, 55 mm from the upstream end of the screws at the indicated rate. Zone A was cooled by circulating water at a temperature of approximately 16° C through the jackets of the barrels in the zone. The screws were operated together in clockwise direction viewed from the discharge end, at equal speeds in the range of 50 to 100 rpm.

The polymer-chlorofluorocarbon premix was rapidly transported in large chunks through the deep flighted screws in section 22 into melt zone B to homogenizing section 24 where the mixture was mechanically worked and melted. Zone B was heated by electric heating elements surrounding the barrels in the zone to a temperature of approximately 95° C.

The molten mixture was next transported into the cooling and milling zone C where the mixture was agitated in homogenizing sections 27 and 28 to form a snow-like mass. Zone C was cooled by circulating water at a temperature of approximately 16° C through the jackets of the barrels in the zone. The polymer exited from the processor as fine powder dispersed in the fluorocarbon solvent. Polymer discharge in the form of an uncompacted snow-like mass was aided by the protrusion of the screws beyond the barrel end. The fluorocarbon solvent was easily removed by sublimation to leave a fine uniform organic powder. Powders were recovered and classified by means of an air elutriator. Particle sizes were determined by sieving. See the Table for data summary.

EXAMPLE 2

Ethylene/vinyl acetate polymer pellets were processed into fine powder in the same manner as described in Example 1 except that a small amount of ethanol was added through port 4 that was provided 320 mm from the upstream end of the screws, to aid in coagulation of the polymer. Data and results are listed in the Table.

EXAMPLE 3

Ethylene/methacrylic acid copolymer pellets pre-mixed with unmelted 1,1,1,2-tetrachloro-2,2-difluoroethane were fed to the twin screw processor and fine powder was produced in the same manner as described in Example 1 except that no additional heat was provided through the jacketed barrel of Zone B. See the data and results summarized in the Table.

EXAMPLES 4 AND 5

The processes were operated generally in the same manner as in Example 1, except that a small amount of a coagulant (50/50, ethanol/water) was added to each mix through port 4, 320 mm from the upstream end of the screws. For these processes, the processor employed for the process of Example 1 was modified by omitting the short section 25 of left-handed screw elements and by replacing it with a right-handed screw section of 24 mm pitch. See the data and results summarized in the Table.

TABLE

| Example No. | | Discharge of Product lb/hr | Polymer Feed lb/hr | Solvent Feed lb/hr | Coag. Feed lb/hr | Screw Speed RPM | Solids Content % | Particle Size % | passed mesh |
|---|---|---|---|---|---|---|---|---|---|
| 1 | Ethylene/Vinyl Acetate (12% VA; melt index 20) | 15 | 7.5 | 7.5 | — | 50 | 50 | 67 | 200 (74μ) |
| 2 | Ethylene/Vinyl Acetate (12% VA; melt index 20) | 15 | 7.5 | 7.5 | 0.5 | 75 | 50 | 67 | 325 (44μ) |
| 3 | Ethylene/Methacrylic Acid (11% MAA; melt index 100) | 15 | 5 | 10 | — | 150 | 33 | 50 | 200 (74μ) |
| 4 | Ethylene/Methacrylic Acid (11% MAA; melt index 100) | 15 | 5 | 10 | 0.5 | 75 | 33 | 75 | 325 (44μ) |
| 5 | Ethylene/Methacrylic Acid (10% MAA; melt index 500) | 15 | 7.5 | 7.5 | 0.5 | 75 | 50 | 75 | 325 (44μ) |

EXAMPLE 6

The process was operated in the same manner as Example 1. Polymethyl methacrylate (500 g) in pellet form premixed with 1400 g of 1,1,1,2-tetrachloro-2,2,difluoroethane and 200 g of plasticizer (133.7 g didecyl phthalate plus 66.7 g dioctyl phthalate) was fed to the twin screw processor. The screws were operated at equal speeds of 75 rpm. Zones and C were cooled by circulating water at a temperature of approximately 16° C through the jacket of the barrels in the zone. Zone B was heated by electric heating elements surrounding the barrel in the zone to a temperature of about 71° to 80° C. Fine polymer powder with plasticizer incorporated therein was produced with particle sizes of less than 325 mesh.

The embodiments of the invention in which an exclusive property or privilege is claimed are defined as follows:

1. A continuous process for preparing particulate, microporous, open-celled polymer structures comprising i. continuously feeding about 5 to 50 parts by weight of a normally solid organic polymer having a glass transition temperature or a crystalline melting point of at least 293° K, and about 95 to 50 parts by weight of a chlorofluorocarbon or a mixture of chlorofluorocarbons having a boiling point in the range of about 10° to 150° C, a melting point in the range of about −40° to 125° C, an entropy of fusion of less than 10 calories/°K/mole, a plastic flow index of at least 0.1 g/10 minutes at the reduced temperature of 0.96 to 0.99 and a solubility in water of less than 2 weight percent to a screw-type extruder having first and second temperature zones, ii. nonrandomly milling said polymer and said chlorofluorocarbon in said first zone at a temperature equal to or above the melting point of the highest melting chlorofluorocarbon present to provide a solution of the polymer in the chlorofluorocarbon, iii. passing said solution to said second zone and nonrandomly milling said solution and cooling said solution to a temperature equal to or below the solidification temperature of the lowest melting chlorofluorocarbon present to form a frozen mass, iv. extruding said frozen mass from said second zone as an uncompacted snow-like mass, and v. removing the chlorofluorocarbon from said snow-like mass at a temperature equal to or below the solidification temperature of the lowest melting chlorofluorocarbon present to form said particulate, microporous, open-celled polymer structures.

* * * * *